US009908377B2

(12) United States Patent
Allcorn et al.

(10) Patent No.: US 9,908,377 B2
(45) Date of Patent: Mar. 6, 2018

(54) APPARATUS AND METHOD FOR SWAY CONTROL (71) Applicant: Hayes Towing Electronics LLC, Arab, AL (US)

(72) Inventors: Roger Allcorn, Arab, AL (US); John S. Meadow, Arab, AL (US)

(73) Assignee: Hayes Towing Electronics LLC, Arab, AL (US)

( * ) Notice: Subject to any disclaimer, the term of this patent is extended or adjusted under 35 U.S.C. 154(b) by 68 days.

(21) Appl. No.: 15/010,228

(22) Filed: Jan. 29, 2016

(65) Prior Publication Data
US 2017/0151845 A1 Jun. 1, 2017

Related U.S. Application Data
(60) Provisional application No. 62/261,673, filed on Dec. 1, 2015.

(51) Int. Cl.
B60T 7/12 (2006.01)
B60D 1/30 (2006.01)
B60T 8/17 (2006.01)
B60T 8/58 (2006.01)
B60T 8/86 (2006.01)
B60T 7/18 (2006.01)
B60T 7/20 (2006.01)

(52) U.S. Cl.
CPC .......... B60D 1/30 (2013.01); B60T 7/18 (2013.01); B60T 7/20 (2013.01); B60T 8/1701 (2013.01); B60T 8/58 (2013.01); B60T 8/86 (2013.01)

(58) Field of Classification Search
CPC combination set(s) only.
See application file for complete search history.

(56) References Cited

U.S. PATENT DOCUMENTS

| 3,758,165 | A |   | 9/1973  | Savelli        |           |
|-----------|---|---|---------|----------------|-----------|
| 3,948,544 | A |   | 4/1976  | Presley et al. |           |
| 4,040,507 | A |   | 8/1977  | Reise          |           |
| 4,060,284 | A | * | 11/1977 | Steiner        | B60T 8/1708 |
|           |   |   |         |                | 188/112 R |
| 4,196,936 | A | * | 4/1980  | Snyder         | B60T 8/248 |
|           |   |   |         |                | 188/112 A |

(Continued)

FOREIGN PATENT DOCUMENTS

AU   2012225142 B2   9/2012
AU   2014100943 B4   9/2014
(Continued)

OTHER PUBLICATIONS

Canadian Office Action dated Dec. 15, 2016 for Canadian Patent Application No. 2,920,398, 5 pages.

Primary Examiner — Jonathan L Sample
(74) Attorney, Agent, or Firm — Quarles & Brady LLP (57) ABSTRACT Embodiments of the invention provide a device and method for controlling sway of a trailer utilizing a global positioning system (GPS) device to detect a speed of a vehicle, a rate gyro to detect a sway angle of the vehicle, and a controller coupled to the GPS device and the rate gyro. The GPS and the rate gyro provide the speed and the sway angle to the controller and the controller outputs a brake command if either a first condition is satisfied or a second condition is satisfied.

20 Claims, 7 Drawing Sheets

(56) References Cited

U.S. PATENT DOCUMENTS

| | | | |
|---|---|---|---|
| 4,232,910 A * | 11/1980 | Snyder | B60T 8/1708 188/181 C |
| 5,001,639 A | 3/1991 | Breen | |
| 5,033,798 A | 7/1991 | Breen | |
| 5,102,202 A | 4/1992 | Breen | |
| 5,108,158 A | 4/1992 | Breen | |
| 5,275,047 A | 1/1994 | Zabler et al. | |
| 5,503,421 A * | 4/1996 | DeLisser | B62D 53/08 280/232 |
| 5,767,404 A | 6/1998 | Kaiser et al. | |
| 5,905,433 A * | 5/1999 | Wortham | G07C 5/008 307/9.1 |
| 6,012,780 A | 1/2000 | Duvernay | |
| 6,042,196 A * | 3/2000 | Nakamura | B60T 7/12 188/112 R |
| 6,139,118 A * | 10/2000 | Hurst | B60T 7/20 188/112 R |
| 6,260,518 B1 | 7/2001 | Jingo | |
| 6,273,522 B1 * | 8/2001 | Feetenby | B60T 7/20 188/112 R |
| 6,280,004 B1 | 8/2001 | Greaves, Jr. | |
| 6,292,094 B1 | 9/2001 | Deng et al. | |
| 6,446,998 B1 * | 9/2002 | Koenig | B60D 1/30 180/169 |
| 6,523,911 B1 * | 2/2003 | Rupp | B60T 7/20 188/112 A |
| 6,668,225 B2 * | 12/2003 | Oh | B60T 7/20 180/282 |
| 6,705,684 B1 * | 3/2004 | Garvey | B60T 7/20 188/112 A |
| 6,806,809 B2 | 10/2004 | Lee et al. | |
| 6,913,328 B2 * | 7/2005 | Eckert | B60T 8/1708 188/1.11 E |
| 6,959,970 B2 * | 11/2005 | Tseng | B60T 8/1708 188/112 R |
| 6,999,856 B2 | 2/2006 | Lee et al. | |
| 7,272,481 B2 | 9/2007 | Einig et al. | |
| 7,447,585 B2 * | 11/2008 | Tandy, Jr. | B60T 8/1708 180/14.2 |
| 7,562,946 B2 * | 7/2009 | Leimbach | B60T 8/1708 303/123 |
| 7,731,302 B2 * | 6/2010 | Tandy, Jr. | B60T 8/1708 303/124 |
| 7,786,849 B2 * | 8/2010 | Buckley | G08G 1/165 180/271 |
| 7,905,555 B2 | 3/2011 | Huntimer | |
| 7,917,274 B2 * | 3/2011 | Hackney | B60T 8/1708 701/82 |
| 8,013,759 B1 | 9/2011 | Aid et al. | |
| 8,165,770 B2 | 4/2012 | Getman et al. | |
| 8,260,518 B2 | 9/2012 | Englert | |
| 8,326,504 B2 | 12/2012 | Wu et al. | |
| 8,463,519 B2 | 6/2013 | McCann | |
| 8,483,911 B2 | 7/2013 | Reich | |
| 8,571,777 B2 | 10/2013 | Greene | |
| 9,026,311 B1 * | 5/2015 | Pieronek | B60W 10/18 280/455.1 |
| 9,120,359 B2 | 9/2015 | Chin et al. | |
| 9,168,901 B2 | 10/2015 | Funder et al. | |
| 9,315,212 B1 * | 4/2016 | Kyrtsos | G05D 1/0088 |
| 9,604,613 B2 * | 3/2017 | Cooper | B60T 8/323 |
| 2003/0141965 A1 * | 7/2003 | Gunderson | B60R 21/013 340/431 |
| 2005/0178622 A1 * | 8/2005 | Blue | B60T 8/1708 188/71.1 |
| 2006/0244579 A1 * | 11/2006 | Raab | B60T 8/1708 340/438 |
| 2007/0257549 A1 * | 11/2007 | Tandy, Jr. | B60T 8/1708 303/7 |
| 2007/0260385 A1 * | 11/2007 | Tandy, Jr. | B60T 8/1708 701/70 |
| 2007/0260386 A1 * | 11/2007 | Tandy, Jr. | B60T 8/1708 701/70 |
| 2008/0157942 A1 * | 7/2008 | Payne | B60R 25/08 340/426.12 |
| 2008/0172163 A1 * | 7/2008 | Englert | B60T 7/20 701/83 |
| 2008/0177454 A1 | 7/2008 | Bond et al. | |
| 2008/0186204 A1 * | 8/2008 | Buckley | G08G 1/165 340/901 |
| 2008/0257656 A1 | 10/2008 | Skinner et al. | |
| 2009/0093928 A1 * | 4/2009 | Getman | B60T 8/1755 701/37 |
| 2009/0105906 A1 * | 4/2009 | Hackney | B60T 8/1708 701/38 |
| 2009/0198425 A1 * | 8/2009 | Englert | B60D 1/30 701/70 |
| 2013/0191000 A1 | 7/2013 | Hahne | |
| 2015/0210254 A1 | 7/2015 | Pieronek et al. | |
| 2016/0101810 A1 * | 4/2016 | Xu | B62D 15/0285 701/41 |
| 2016/0101811 A1 * | 4/2016 | Kyrtsos | B62D 13/06 701/25 |
| 2016/0362135 A1 * | 12/2016 | Xu | B62D 13/06 |
| 2017/0029024 A1 * | 2/2017 | Lavoie | B62D 13/06 |
| 2017/0080974 A1 * | 3/2017 | Lavoie | B60K 37/02 |
| 2017/0101130 A1 * | 4/2017 | Lavoie | B62D 1/02 |
| 2017/0113722 A1 * | 4/2017 | Lavoie | G08G 1/168 |

FOREIGN PATENT DOCUMENTS

| | | |
|---|---|---|
| JP | 51108419 A | 9/1976 |
| JP | 04173456 A | 6/1992 |

\* cited by examiner

APPARATUS AND METHOD FOR SWAY CONTROL

BACKGROUND

A trailer is an unpowered vehicle that is generally pulled or towed by a powered vehicle. A trailer may be an enclosed toy trailer, a mobile home, a travel trailer, a recreational vehicle, or any other unpowered single or multi-axel vehicle that is towed by a powered/towing vehicle. A trailer hitch, a fifth wheel coupling, or other type of tow hitch is needed to connect a trailer to the towing vehicle to draw the trailer with the towing vehicle, which can be, for example, a car, a truck, or other traction engine. A trailer is typically coupled to a towing vehicle by a ball socket, but may be coupled in some other fashion. Trailers may be coupled in a number of ways to the towing vehicle including by a drawbar or a tow bar.

When a towing vehicle pulls a trailer, external forces may cause the trailer to sway in either one direction or multiple directions. Trailer sway is a fishtailing motion of the trailer, which is caused by external forces that set the trailer's mass into lateral motion with the ball socket serving as the axis or pivot point. The motion can be described as a sideways seesaw. Typically, trailers sway in response to a high towing speed, swerving movement of the towing vehicle, gusting winds, bad roads, downhill travel, poor trailer design, poor weight distribution, or a bow wave of a large semi-truck, a box truck, or a van overtaking the trailer from the rear. Some trailers are designed for correction by the driver and will quickly re-stabilize. However, some trailers will continue to sway after the force that caused the instability has ceased. In fact, in some trailers, the sway motion may increase until control of both the towing vehicle and the trailer is lost. Unfortunately, many trailers are prone to sway due to poor weight distribution.

Trailer sway is an inevitable part of trailer towing which can be mitigated using a number of mitigation techniques. One such mitigation technique is to brake the trailer independently of the towing vehicle. When the speed of a trailer is reduced independent of its towing vehicle, tension is created between the vehicle and the trailer, which helps to stabilize the system. However, there remains a need for a cost-effective, reliable trailer sway mitigation device which would initiate braking of a trailer, thereby alleviating driver hesitations that trailer sway could initiate a dangerous condition for those aboard the towing vehicle and trailer combination.

SUMMARY

In one aspect of the invention, a device for controlling sway of a vehicle may comprise a global positioning system (GPS) receiver operable to detect a speed of the vehicle, a rate gyro operable to detect sway of the vehicle; a voltage regulator coupled to the rate gyro, and a controller coupled to the voltage regulator, the GPS receiver, and the rate gyro. The GPS receiver and the rate gyro provide speed information and sway information to the controller. The controller outputs a brake command if the speed of the vehicle is above a first predetermined threshold and sway of the vehicle in only a first lateral direction is above a second predetermined threshold and the brake command is to apply the brakes of the vehicle for a first predetermined period of time. The controller also outputs a brake command if the speed of the vehicle is below the first predetermined threshold and sway of the vehicle in a first lateral direction and a second lateral direction opposite the first direction is above a third predetermined threshold and the brake command is to apply the brakes for a second predetermined period of time.

In some embodiments, the first predetermined threshold is 75 kilometers per hour.

In some embodiments, second predetermined threshold is 2.5 degrees per second.

In some embodiments, the first and second predetermined periods of time are different.

In some embodiments, the first and second predetermined periods of time are the same and are 2 seconds.

In some embodiments, the third predetermined threshold is 2.5 degrees per second.

In another aspect of the invention, a device for controlling sway of a trailer comprises a housing including a global positioning system (GPS) device to detect a speed of the trailer, a rate gyro to detect sway of the trailer, and a controller coupled to the GPS device and the rate gyro. The GPS device and the rate gyro provide the speed and the sway angle to the controller and the controller outputs a brake command if a first condition is satisfied and a second condition is satisfied.

In some embodiments, the first condition is satisfied if the speed is above a speed threshold.

In some embodiments, the speed threshold is 75 kilometers per hour.

In some embodiments, the second condition is satisfied if the sway is above a sway threshold in only a first lateral direction.

In another aspect of the invention, the speed threshold is 75 kilometers per hour and the second condition and the second condition is satisfied if the sway in the first lateral direction is greater than 2.5 degrees per second.

In some embodiments, the first condition is satisfied if the speed is below a speed threshold.

In some embodiments, the speed threshold is 75 kilometers per hour.

In still some embodiments, the second condition is satisfied if the sway is measured in only a first lateral direction and a second lateral direction opposite the first lateral direction is above the sway threshold.

In some embodiments, the speed threshold is 75 kilometers per hour and the second condition is satisfied if the sway is measured in both the first and second lateral directions is greater than 2.5 degrees per second.

In another aspect of the invention, a method for controlling sway of a trailer includes detecting a speed of a trailer, detecting an angular speed of the trailer, and sending a first signal, by a controller, to trigger trailer brakes if a first condition is satisfied and a second condition is satisfied.

In some embodiments, the first condition is satisfied if the speed of the trailer is above a speed threshold and the second condition is satisfied if the angular speed of the trailer is above a sway threshold in only a first direction.

In some embodiments, the speed threshold is 75 kilometers per hour and the sway threshold is 2.5 degrees per second.

In still some embodiments, the first condition is satisfied if the speed of the trailer is below a speed threshold and the second condition is satisfied if the angular speed of the trailer is above a sway threshold in first and second opposing lateral direction.

In some embodiments, the speed threshold is 75 kilometers per hour and the sway threshold is 2.5 degrees per second.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1:
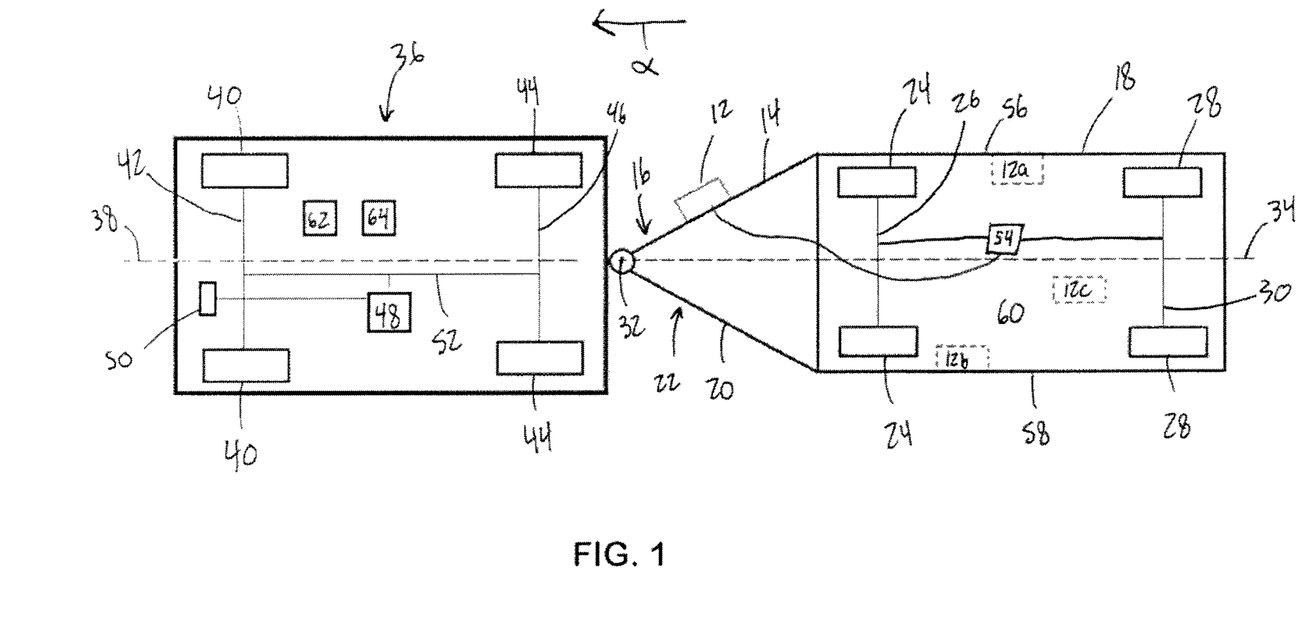
FIG. 1 illustrates a block diagrammatic view of a sway control system applied to a towing vehicle and trailer combination, in accordance with an embodiment of the present invention.

FIG. 1 illustrates a block diagrammatic view of a towing vehicle and trailer combination 10 including a sway control device 12 attached to a first leg 14 of a tongue 16 of a trailer 18. The tongue 16 may further include a second leg 20. The illustrated tongue 16 is an A-frame 22. The trailer 18 includes front wheels 24, a front axel 26, rear wheels 28 and a rear axel 30. While particular trailers are depicted herein, the sway control device 12 of the present application may be utilized with any trailer. For example, the trailer 18 may include only a single set of wheels and a single axel, or may include more sets of wheels and more corresponding axels. Still further, the trailer 18 may have any dimensions and/or features. The tongue 16 is coupled to a towing vehicle 36. The tongue 16 may be coupled to the towing vehicle 36 via a ball and socket combination (not shown) or may be coupled to the towing vehicle 36 in some other fashion such that the trailer 18 is pivotable about a pivot point 32. A longitudinal axis 34 of the trailer 18 extends through the pivot point 32. The towing vehicle 36 includes a longitudinal axis 38 which also extends through the pivot point 32 and is aligned with the longitudinal axis 34 of the trailer 18 during straight line driving in the direction of an arrow α, as shown in FIG. 1.

The towing vehicle 36 may generally include front wheels 40, a front axel 42, rear wheels 44, and a rear axel 46. The towing vehicle 36 further includes a towing vehicle brake system 48 which is controlled by a brake pedal 50. The front wheels 40 and rear wheels 44 are adapted to be selectively braked by a user when the brake pedal 50 is actuated. The towing vehicle brake system 48 may include an oil hydraulic brake circuit 52. The towing vehicle 36 may be a car, a tractor, an off road vehicle, a semi-tractor trailer, or any other vehicle capable of towing a trailer. While particular towing vehicles 36 are depicted and described herein, the sway control device 12 of the present disclosure may be utilized in conjunction with any towing vehicle. The towing vehicle 36 is coupled to the trailer 18 at the pivot point 32.

As further illustrated in FIG. 1, the sway control device 12 may attached to the first leg 14 of the tongue 16. In alternative embodiments, the sway control device 12 may be coupled to the second leg 20 of the tongue 16. The sway control device 12 is also electrically coupled to a trailer brake system 54. However, the sway control device 12 may be attached to the second leg 20, or may be attached to the trailer 18 at any other suitable location. As illustrated in FIG. 1, the sway control device 12 may be located adjacent a right wall 56 of the trailer 18 or may be adjacent a left wall 58 of the trailer 18. The sway control device 12 may further be placed at any point along a floor 60 (or wall or ceiling) of the trailer 18 as shown in dashed lines by the alternative locations of sway control devices 12a, 12b, and 12c. An advantage of the disclosed system is that the sway control device 12 need only be fixedly attached to the trailer 18 (so as to not move around and potentially damage the device 12) and electrically coupled to the trailer brake system 54 and a power source (not shown) for the sway control device 12 to operate. The sway control device 12 may, therefore, be positioned in any suitable location on the trailer 18.

Figure 2:
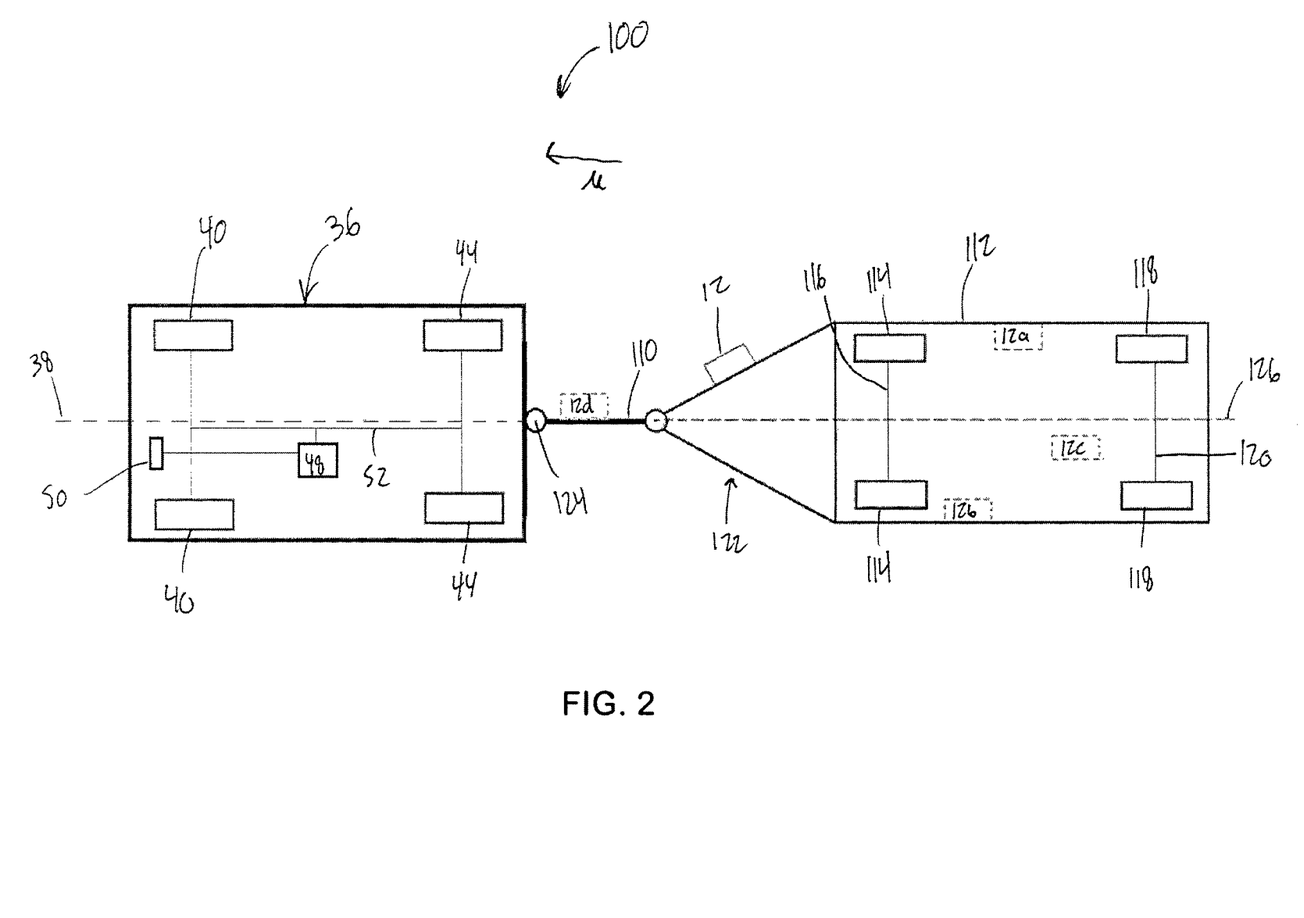
FIG. 2 illustrates a block diagrammatic view of another sway control system applied to a towing vehicle and trailer combination.

As illustrated in FIG. 2, another embodiment of a towing vehicle and trailer combination 100 may include a drawbar 110. In this embodiment, a trailer 112 may include front wheels 114, a front axel 116, rear wheels 118, a rear axel 120, and a tongue 122. The drawbar 110 may be a part of the tongue 122. The tongue 116 may be coupled to a vehicle 118 via a ball and socket combination (not shown) or may be coupled to the vehicle 118 in some other suitable fashion such that the trailer 112 is pivotable about a pivot point 124. A longitudinal axis 126 of the trailer 112 extends through the pivot point 124. The longitudinal axis 38 of the towing vehicle 36 also extends through the pivot point 124 and is aligned with the longitudinal axis 126 of the trailer 112 during straight line driving in the direction of arrow μ as shown in FIG. 2. As illustrated in FIG. 2, a sway control device 12d, shown in dashed lines, may be located along the drawbar 110. As further illustrated in FIG. 2, the sway control device 12d (whether located along the drawbar 110 or in any other location) may not be electrically connected to a trailer brake system (not shown), but rather may be wirelessly coupled to the trailer brake system.

Figure 3:
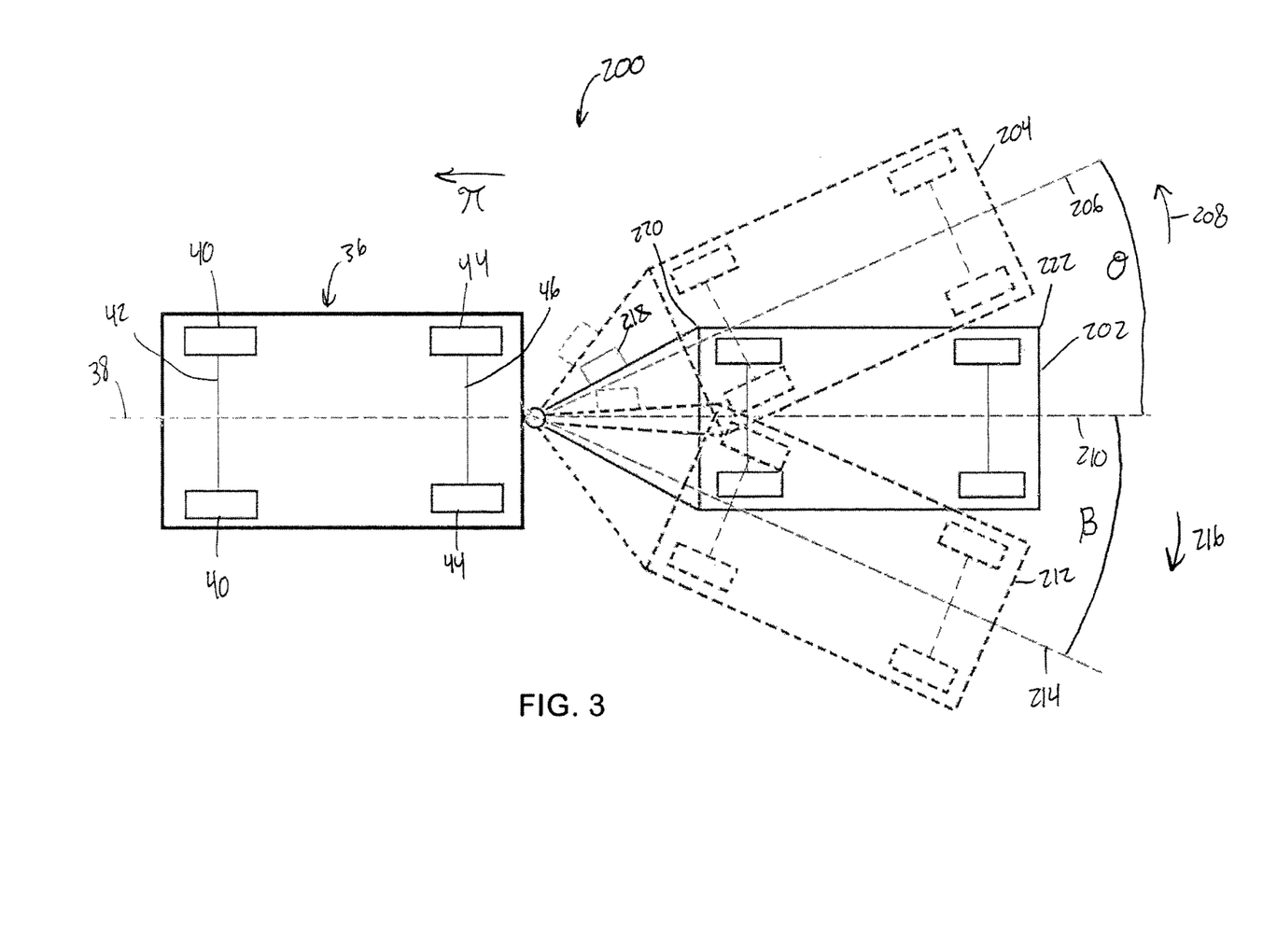
FIG. 3 illustrates a towing vehicle and trailer combination in an original, stable condition and in first and second swayed positions, which are depicted in dashed lines.

FIG. 3 illustrates a towing vehicle and trailer combination 200 similar to the towing vehicle and trailer combination 10 of FIG. 1 traveling in a forward direction, which is identified by the arrow π. The vehicle and trailer combination 200 is shown in solid lines and alternative positions of a trailer 202 are shown in dashed lines. The trailer 202 shown in solid lines is hereinafter referred to as the unswayed trailer 202. When the unswayed trailer 202 is swayed in a first direction, the resultant position is depicted by a first swayed trailer 204, shown in dashed lines and having a longitudinal axis 206, the first direction being illustrated by an arrow 208. In the first swayed position, the longitudinal axis 206 of the first swayed trailer 204 creates an angle Θ between a longitudinal axis 210 of the of the unswayed trailer 202 and the longitudinal axis 206 of the first swayed trailer 204. When the unswayed trailer 202 is swayed in a second direction, the resultant position is depicted by a second swayed trailer 212, also shown in dashed lines and having a longitudinal axis 214, the second direction being illustrated by an arrow 216. An angle β is formed between the longitudinal axis 210 of the unswayed trailer 202 and the longitudinal axis 214 of the second swayed trailer 212. As further illustrated in FIG. 3, the unswayed trailer 202 includes a sway control device 218.

Figure 4:
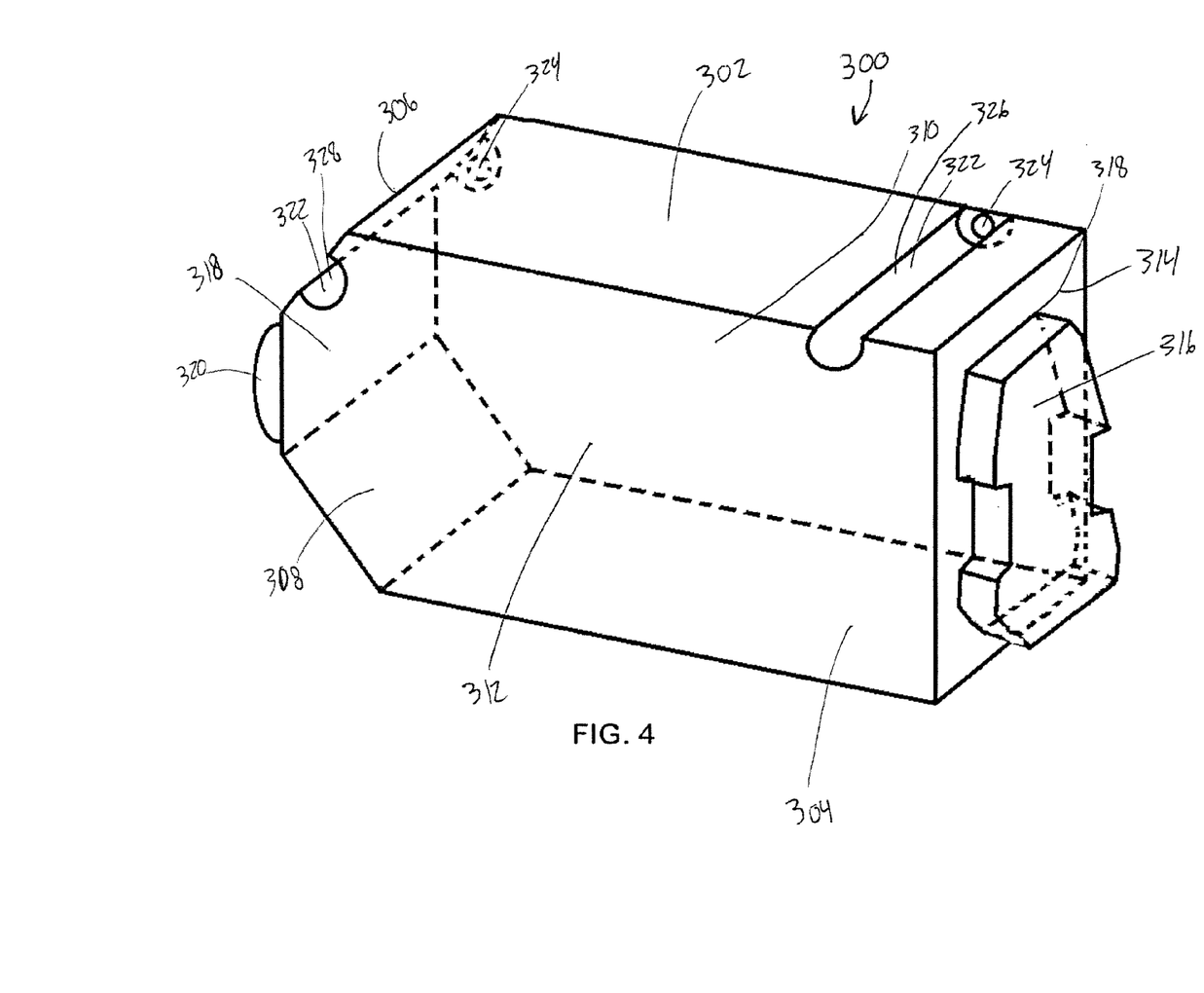
FIG. 4 illustrates a top, rear isometric view of a housing of a sway controller used to implement the system of FIG. 1.

An exemplary, non-limiting embodiment of a housing 300 for the sway control device 12 is illustrated in FIG. 4. The housing 300 includes a top face 302, a bottom face 304, an upper angled face 306, a lower angled face 308, and longitudinal side faces 310, 312. The housing 300 further includes an input face 314 for receiving an electric power input (not shown) from the towing vehicle 36. The input face 314 may include a plug cover 316 that is pivotally attached to the input face 314 at a pivot point 318. The plug cover 316 may be pivoted to unveil an electrical outlet (not shown) thereby allowing plugging of an electrical input cord (not shown) into the housing 300. The housing 300 may also include an output face 318 that includes an electrical output 320. The electrical output 320 receives an electrical cord (not shown) that electrically couples the sway control device 12 to the trailer brake system 54. In an exemplary embodiment, the housing 300 includes connector slots 322 and connector holes 324 disposed along one or more faces 302, 304, 306, 308. In the illustrated embodiment, a first connector slot 326 is disposed along the top face 302 and a second connector slot 328 is disposed along the upper angled face 306. The connector holes 324 receive connectors (not shown) that attach the housing 300 to the trailer 18. The housing 300 may include more or fewer connector slots 322 and/or connector holes 324 to attach the housing 300 to the trailer 18 and the connector holes may be positioned at any point on the housing 300.

Figure 5:
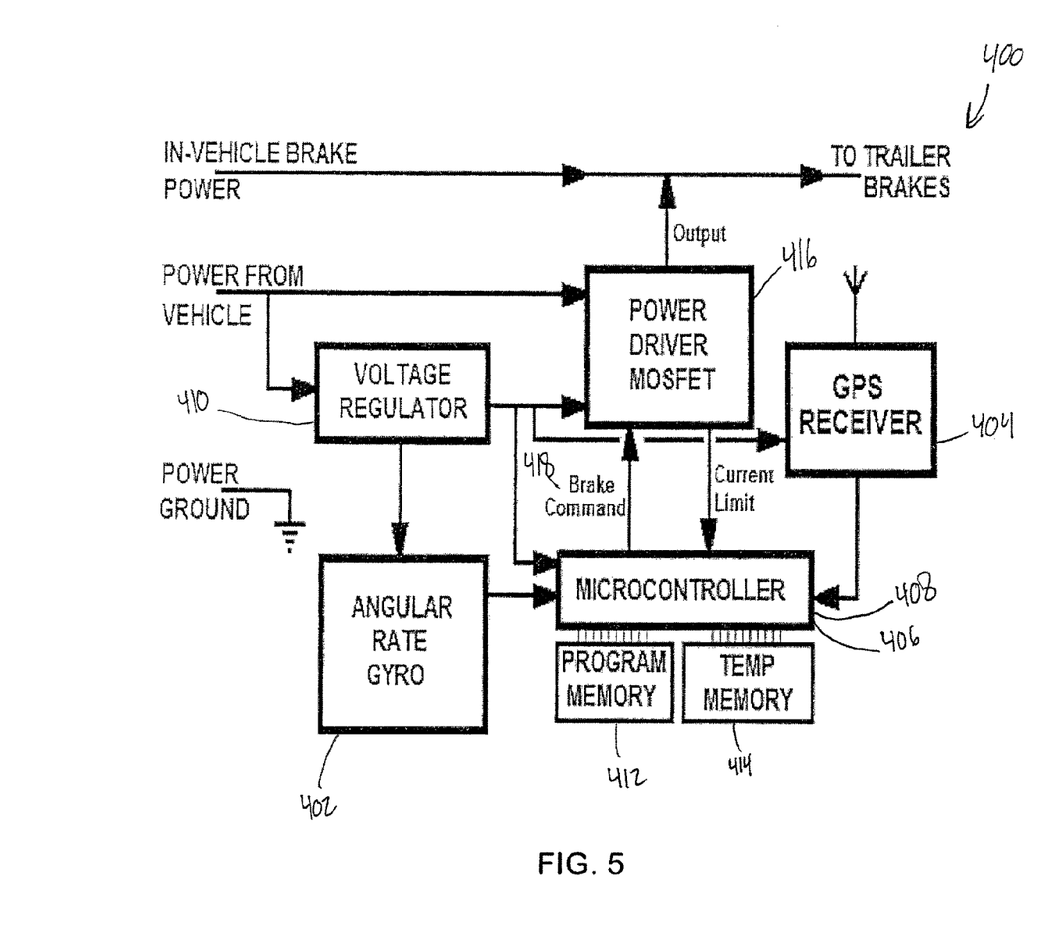
FIG. 5 illustrates a system diagram of electronics that may be used to implement the sway controller of FIG. 4.

FIG. 5 illustrates a system diagram 400 of the electronic components that are included in the sway control device 12. In an exemplary embodiment, the electronic components are included within the housing 300. However, in alternative embodiments, some or all of the electronic components may be partially included within the housing 300, or may be disposed at a location along either the trailer 18 or the towing vehicle 36. In an exemplary embodiment, the electronic components include a rate gyro 402, a global positioning system (GPS) device or receiver 404, and a controller 406. The controller 406 is a microcontroller 408 in the illustrated embodiment, but may be any suitable controller in other illustrative embodiments. As seen in the system diagram 400 of FIG. 5, the sway control device 12 further includes a voltage regulator 410, program memory 412, temporary memory 414, and a power driver MOSFET 416. Power is received from the towing vehicle 36 to run the electronic components. In another embodiment, a battery (not shown) may be included within the housing to alternatively or additionally provide power to the electronic components. In some embodiments in which the device 12 includes a battery, the battery may be removable for replacement or recharging and/or the entire device 12 may be rechargeable. In some embodiments, the sway control device 12 may further include an accelerometer, a tilt sensor, a magnetometer, or any other sensing device. In still a further embodiment, the controller 406 may be coupled to a wireless receiver, which may allow a user to manually monitor and/or adjust the system.

As shown in the system diagram 400 of FIG. 5, the rate gyro 402, the controller 406, the GPS receiver 404, and the MOSFET 416 receive regulated power from the voltage regulator 410. The controller 406 is coupled to the program memory 412 and the temporary memory 414. The controller 406 receives data from the rate gyro 402, the GPS receiver 404, and the MOSFET 416. The controller 406 is configured to output a brake command 418 when one or more conditions are satisfied, as will be discussed in greater detail below, based on information received from the rate gyro 402, the GPS receiver 404, and one or both of the program memory 412 and the temporary memory 414. The brake command 418 is output through the MOSFET 416 to the trailer brake system 58 to actuate braking of the trailer 18. In an exemplary embodiment, the MOSFET 416 is a transistor that is used for amplifying or switching electrical signals.

As stated above, the sway control device 12 may be attached to the trailer 18 at any suitable location. Referring to FIGS. 1 and 5, the sway control device 12 may be so situated because the sensing components of the sway control device 12. i.e. the rate gyro 402 and the GPS receiver 404, will return the same measurements no matter where the sway control device is positioned. The GPS receiver 404 measures a velocity of the trailer 18, which will be the same at every point on the trailer 18 regardless of a distance of the sway control device 12 from the pivot point 32. The rate gyro 402 measures an angular velocity of the trailer 18, which will also be the same regardless of where the sway control device 12 is positioned and regardless of a the distance the sway control device 12 is from the pivot point 32. This is because angular velocity is measured in degrees per second. Referring back to FIG. 3, the sway of the trailer 18 measured in degrees per second will be no different if measured on a front end 220 of the unswayed trailer 202 or a rear end 222 of the unswayed trailer 202. Thus, an advantage of the disclosed sway control device 12 is that it can be mounted to any part of the trailer 18 and will obtain the same position information regardless of where the sway control device 12 is situated. In contrast, if the device 12 were to measure acceleration, the device 12 would need to be located nearer a rear portion of the trailer 18 where acceleration is at its highest. As the device 12 with an accelerometer nears the pivot point 32, the acceleration measured at that point nears zero (because the acceleration at the pivot point would be zero).

Figure 6:
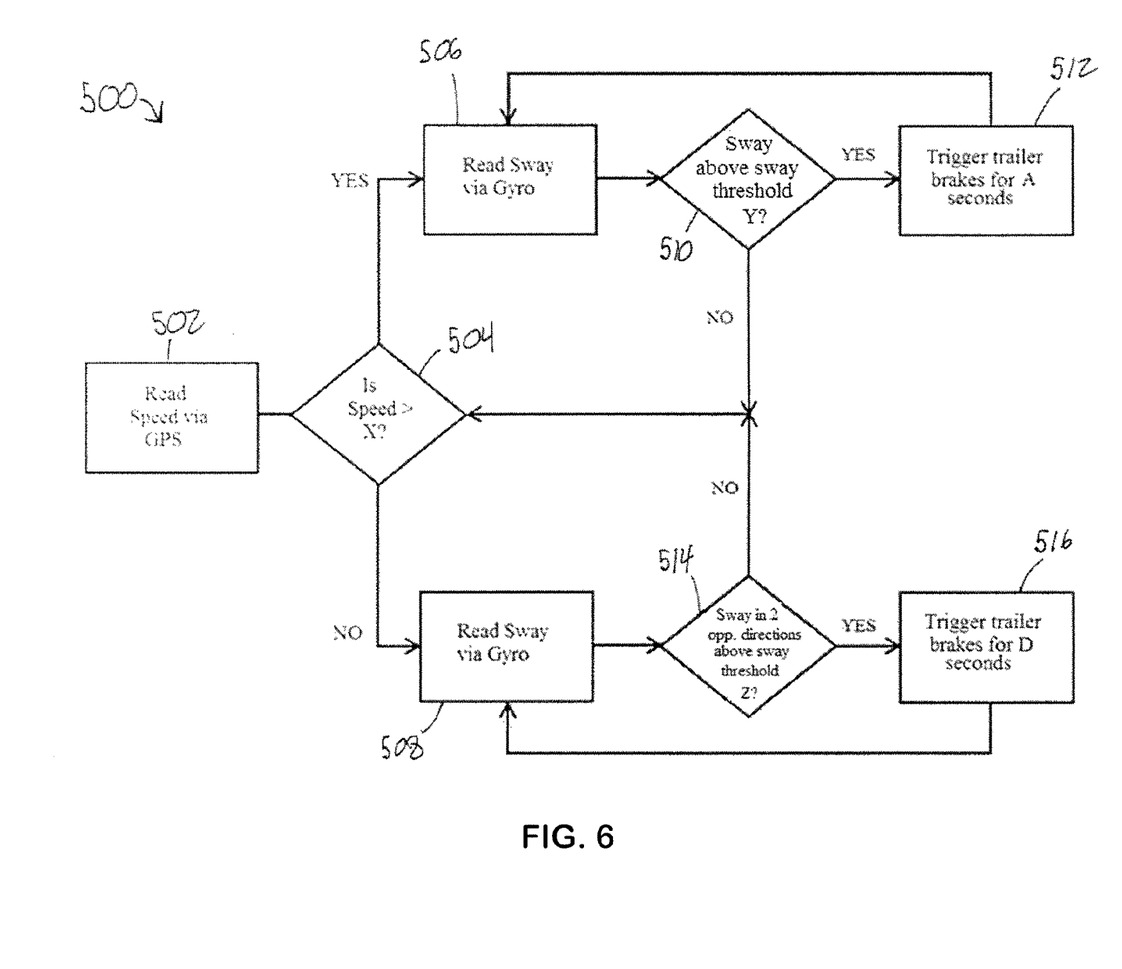
FIG. 6 illustrates a flow chart of a method for controlling sway in a towing vehicle and trailer combination.

FIG. 6 illustrates a flow chart of an exemplary method of sway control 500 that can be implemented via the sway control device 12/218. As an initial matter, referring to FIGS. 1 and 5, the sway control device 12 operates in such a manner that, when one or more of a plurality of pre-determined conditions is/are satisfied, the sway control device 12 outputs the brake command 418 to brake the trailer 18 for a pre-determined duration of time. Still referring to FIGS. 1 and 5, the method of sway control 500 of the flowchart illustrated in FIG. 6 is started upon power being sent from the vehicle 36 to the sway control device 12 and is executed repetitively at a pre-determined cycle time for as long as power is supplied to the sway control device 12. The method of sway control 500 begins with step 502 wherein the GPS receiver 404 determines a speed of the vehicle 36. The determined speed is sent from the GPS receiver 404 to the controller 406. The method of sway control 500 then proceeds to step 504. At step 504, the controller 406 determines if the determined speed is greater than a pre-determined speed threshold X. If the determined speed is greater than the pre-determined threshold X, the method of sway control 500 proceeds to step 506. If the determined speed is less than the pre-determined threshold X, the method of sway control proceeds to step 508. In some embodiments, the pre-determined speed threshold may be between about 40 and about 100 kilometers per hour, between about 60 and about 80 kilometers per hour, or about 75 kilometers per hour.

If the determined speed is greater than X, then the method of sway control 500 proceeds to step 506 wherein the rate gyro 402 determines sway of the trailer 18. The determined sway is measured in degrees per second. The determined sway is sent from the rate gyro 402 to the controller 406. The method of sway control 500 then proceeds to step 510 in which the controller 406 determines whether the determined sway is greater than a pre-determined sway threshold or angular velocity in only one lateral direction.

In an exemplary embodiment, the pre-determined sway threshold for one direction of sway may be between about 1 and about 8 degrees per second, between about 2 and about 6 degrees per second, or about 2.5 degrees per second. If the controller 406 determines that the determined sway is above the pre-determined threshold Y, then the method of sway control 500 proceeds to step 512 and the controller 406 sends a braking command 418 to the trailer brake system 54 to brake for a pre-determined time period of A seconds. The pre-determined time period A may be between about 0.25 and about 5 seconds, between about 1 and about 4 seconds, or about 1 second or about 2 seconds. Further, in an exemplary embodiment, the braking command 418 initiates braking at a pre-determined percentage P of maximum braking. The pre-determined percentage P may be between about 20% and about 70%, between about 30% and about 50%, or about 40%.

After the braking command 418 is initiated, the method of sway control 500 then returns to step 506 where the rate gyro 402 determines a new sway of the trailer 18. The method of sway control 500 then proceeds to step 510. If at step 510 the controller 406 determines, based on the sway information, that sway in one lateral direction is not greater than Y, then the method of sway control 500 proceeds back to step 504. Once at step 504, the controller 406 determines if the determined speed is greater than the pre-determined speed threshold X and proceeds to either block 506 or block 508 based on the determined speed.

The above described portion of the method of sway control 500 (Steps 506, 510, and 512) is initiated when the speed of the trailer 18 is above a particular threshold and sway of the trailer 18 is greater than a predetermined threshold in a single direction. For example, steps 506, 510, and 512 are initiated when the speed is over the pre-determined threshold X, and when the sway is in only a single lateral direction is above a pre-determined sway threshold Y.

In contrast, and still referring to FIG. 6, if the controller 406 determines that the speed is less than the pre-determined threshold speed X in step 504, then the method of sway control 500 proceeds to step 508 wherein the rate gyro 402 determines sway of the trailer 18. The determined sway is measured in degrees per second. The determined sway is sent to the controller 406. The method of sway control 500 then proceeds to step 514. In step 514, the controller 406 determines if the sway in two different and opposing lateral directions is greater than a pre-determined sway threshold Z. As an example, this occurs if sway in the direction 208 is greater than the sway threshold Z, followed immediately by sway in the direction 216 that is greater than the sway threshold Z.

In some embodiments, the pre-determined sway threshold in each of two opposing lateral directions may be between about 1 and about 8 degrees per second, between about 2 and about 6 degrees per second, or about 2.5 degrees per second. In some embodiments, the predetermined sway threshold Z may be the same as the pre-determined sway threshold Y. In other embodiments, the sway thresholds Y and Z may be different. If the controller 406 determines that the determined sway is above the pre-determined threshold Z in both directions 208, 216, then the method of sway control 500 proceeds from step 514 to step 516 and the controller 406 sends the brake command 418 to the trailer brake system 58 to brake for a pre-determined time period, D seconds. In an exemplary embodiment, the pre-determined time period D may be between about 0.25 and about 5 seconds, between about 1 and about 4 seconds, or about 1 second or about 2 seconds. Further, in an exemplary embodiment, the braking command 418 initiates braking at a pre-determined percentage Q maximum braking. In an exemplary embodiment, the pre-determined percentage Q may be between about 20% and about 70%, between about 30% and about 50%, or about 40%. After (or during) the pre-determined time period D, the process returns to step 508, wherein the sway is again determined and, at step 514, the sway is determined and the process checks to see if the braking corrected the sway issues. More particularly, the controller 406 determines whether the sway in two different and opposing lateral directions is greater than the pre-determined sway threshold Z. This loop is repeated (and braking is repeated) until the sway in two different and opposing lateral direction is no longer greater than the pre-determined sway threshold Z, in which case, the process returns to step 504.

If at step 514 the controller 406 determines, based on the sway information, that the sway in two different and opposing lateral directions is not greater than the pre-determined sway threshold Z, then the method of sway control 500 proceeds back to step 504. Once at step 504, the controller 406 again determines the speed and proceeds through the process, as discussed above.

The above described portion of the method of sway control 500 (Steps 508, 514, and 516) is initiated when sway of the trailer is below a particular speed threshold. Steps 508, 514, and 516 are initiated when the speed is below a pre-determined threshold, and when the sway is in a multiple directions. Referring to FIG. 3, step 508 of the method of sway control 500 is initiated if the vehicle and trailer combination 200 were driving in the direction of the arrow π at a rate of speed above a pre-determined threshold. If the speed were below the pre-determined threshold, the method of sway control would move to step 508. If the unswayed trailer 202 were to move to the position of the first swayed trailer 204 at an angular velocity greater than the sway threshold Z and, subsequently, the unswayed trailer 202 were to move to the position of the second swayed trailer 212 at an angular velocity greater than the sway threshold Z, then the method of sway control 500 would proceed to step 516 and the brake command 418 would be sent via the controller 406 to the trailer brake system 54. After the brake command 418 is initiated, the method of sway control 500 returns to step 508.

Figure 7:
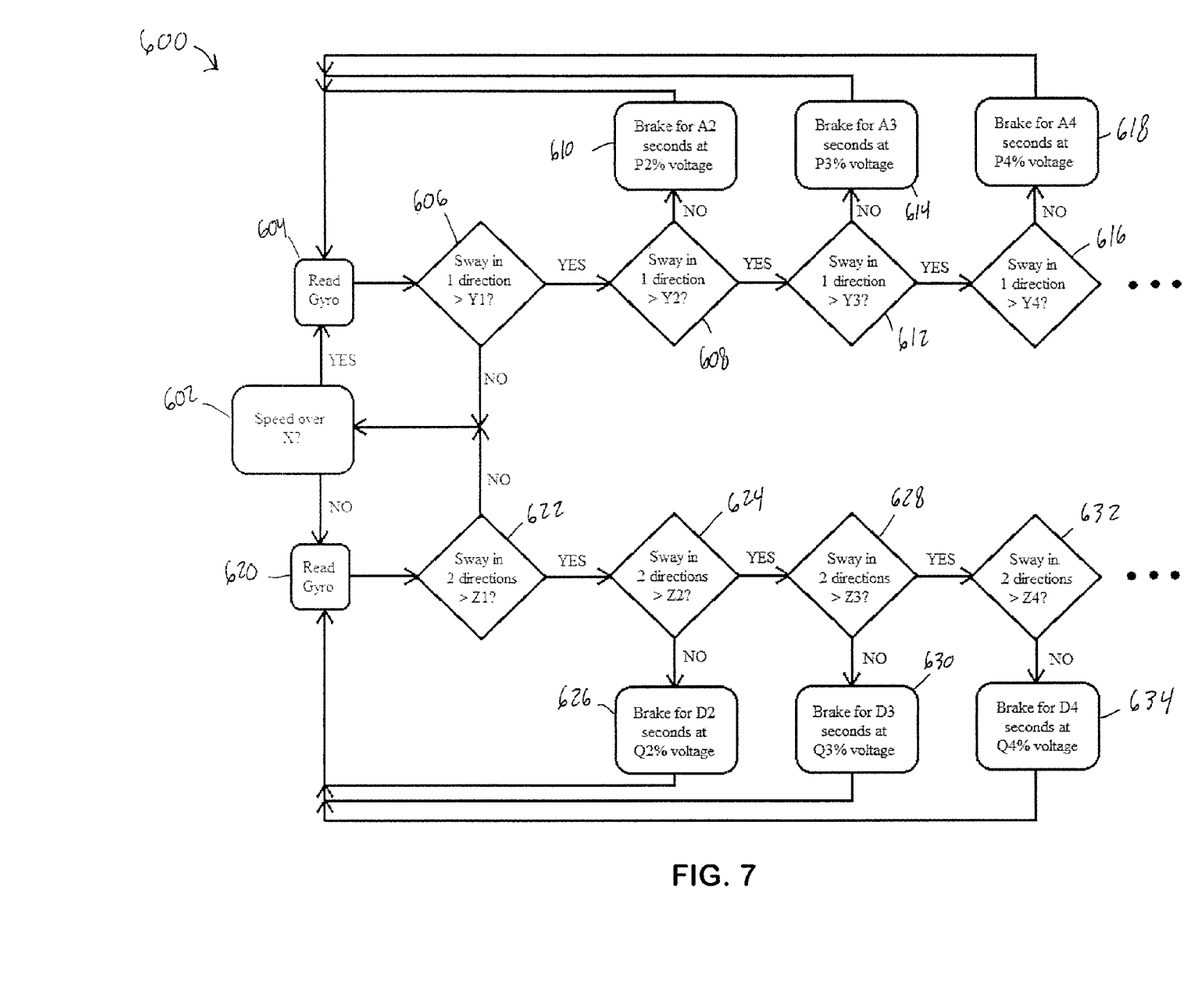
FIG. 7 illustrates a flow chart of an alternative method for controlling sway in a towing vehicle and trailer combination.

While the method of FIG. 6 is described as applying a voltage to the trailer brake system 48 for a pre-determined duration, in alternative embodiments, the voltage may be varied dependent upon a detected speed and/or angular velocity (in one or more directions) and/or the duration of braking may be varied dependent upon a detected speed and/or angular velocity (in one or ore directions). For example, FIG. 7 illustrates a flow chart depicting another method of sway control 600 that may be implemented via the sway control device 12/218. The method of sway control 600 operates such that when one or more of a plurality of pre-determined conditions is/are satisfied, the sway control device 12/218 outputs a brake command to brake the trailer 18 for a pre-determined duration of time. The method of sway control 600 of FIG. 7 is started upon power being sent from the vehicle 36 to the sway control device 12/218 and is executed repetitively at a pre-determined cycle time for as long as power is supplied to the sway control device 12/218. In some embodiments there may also be a switch, button, dial, or other device that a user may actuate to turn the sway control device 12 on and off. In some embodiments, the sway control device 12/218 may be turned on or off by remote means such as a cell phone, tablet, or other handheld electronic device.

The method of sway control 600 begins with step 602 wherein the GPS receiver 404 determines a speed of the vehicle 36. The determined speed is sent from the GPS receiver 404 to the controller 406. If the determined speed is greater than X, then the method of sway control 600 proceeds to step 604. At step 604, the rate gyro 402 measures the angular velocity of the trailer 18 after which the method of sway control 600 proceeds to step 606. At step 606, the controller 406 determines whether there is sway in one direction and whether sway is above a first sway threshold Y1. If the controller 406 determines that sway is in one direction and above a first sway threshold Y1, then the method of sway control 600 proceeds to step 608. If the controller 406 determines that sway is not in one direction and above a first threshold Y1, then the method of sway control 600 proceeds back to step 602.

Once at step 608, the controller 406 determines whether sway in one direction is greater a second sway threshold Y2. If the controller 406 determines that sway in one direction is not greater than a second sway threshold Y2, then the method of sway control 600 proceeds to step 610. At step 610, the controller 406 sends a brake command to the trailer brake system 54 to brake for A2 seconds at P2% voltage. After step 610, the method of sway control 600 returns to step 604 where the rate gyro 402 again measures sway. Referring back to step 608, if the controller 406 instead determines that sway in the one directions is greater than the second sway threshold Y2, then the method of sway control 600 proceeds to step 612. At step 612, the controller 406 determines whether sway in one direction is greater a third sway threshold Y3. If the controller 406 determines that sway in one direction is not greater than a third sway threshold Y3, then the method of sway control proceeds to step 614. At step 614, the controller 406 sends a brake command to the trailer brake system 54 to brake for A3 seconds at P3% voltage. After step 614, the method of sway control 600 returns to step 604 where the rate gyro 402 again measures sway. Referring back to step 612, if the controller 406 instead determines that sway in one direction is greater than the third sway threshold Y3, then the method of sway control 600 proceeds to step 616.

At step 616, the controller 406 determines whether sway in one direction is greater than a fourth sway threshold Y4. If the controller 406 determines that sway in one direction is not greater than the fourth sway threshold Y4, then the method of sway control 600 proceeds to step 618. At step 618, the controller 406 sends a brake command to the trailer brake system 54 to brake for A4 seconds at P4% voltage. After step 618, the method of sway control 600 returns to step 604 where the rate gyro 402 again measures sway. Referring back to step 616, if the controller 406 determines that sway in one direction is greater than the fourth sway threshold Y4, then the method of sway control may proceed to a subsequent step where the controller 406 determines whether sway is above a fifth, or a sixth, or a seventh, etc. sway threshold. There may be an infinite number of sway thresholds Y, brake timing durations A, and percentages of braking voltage P. In an exemplary embodiment, Y1 is less than Y2, Y2 is less than Y3, Y3 is less than Y4, etc. Further, A2 is less than A3 and A3 is less than A4, etc. Even further, P2 is less than P3 and P3 is less than P4, etc. In other words, the time periods A1, A2, A3, A4, etc. and the voltages P2, P3, P4, etc. may increase as the sway thresholds Y1, Y2, Y3, Y4, etc. increase. The time period and voltage for braking, therefore, increase as the angular velocity (in a single direction) increases.

Referring back to step 602, if the controller 406 determines that the speed of the trailer 18 is not above X, then the method of sway control 600 proceeds to step 620. At step 620, the rate gyro 402 measures the angular velocity of the trailer 18. Thereafter, the method of sway control 600 proceeds to step 622. At step 622, the controller 406 determines whether sway in two directions is greater than a first sway threshold Z1. If the controller 406 determines that sway is in two directions is not greater than a first sway threshold Z1, then the method of sway control 600 returns to step 602. However, if the controller 406 determines that sway in two directions is greater than the first sway threshold Z1, then the method of sway control 600 proceeds to step 624.

Once at step 624, the controller 406 determines whether sway in two directions is greater than a second sway threshold Z2. If the controller 406 determines that sway in two directions is not greater than a second sway threshold Z2, then the method of sway control 600 proceeds to step 626. At step 626, the controller 406 sends a brake command to the trailer brake system 54 to brake for D2 seconds at Q2% voltage. After step 626, the method of sway control 600 returns to step 620 where the rate gyro 402 again measures sway. Referring back to step 624, if the controller 406 instead determines that sway in two directions is greater than the second sway threshold Z2, then the method of sway control 600 proceeds to step 628. At step 628, the controller 406 determines whether sway in two directions is greater than a third sway threshold Z3. If, at step 628, the controller 406 determines that sway in two directions is not greater the third sway threshold Z3, then the method of sway control proceeds to step 630. At step 630, the controller 406 sends a brake command to the trailer brake system 54 to brake for D3 seconds at Q3% voltage. After step 630, the method of sway control 600 returns to step 620 where the rate gyro 402 again measures sway. Referring back to step 628, if the controller 406 instead determines that sway in two directions is greater than the third sway threshold Z3, then the method of sway control 600 proceeds to step 632.

At step 632, the controller 406 determines whether sway in two directions is greater than a fourth sway threshold Z4. If the controller 406 determines that sway in two direction is not greater than the fourth sway threshold Z4, then the method of sway control 600 proceeds to step 634. At step 634, the controller 406 sends a brake command to the trailer brake system 54 to brake for D4 seconds at Q4% voltage. After step 634, the method of sway control 600 proceeds back to step 620 where the rate gyro 402 again measures sway. Referring back to step 632, if the controller 406 determines that sway in two directions is greater than the fourth sway threshold Z4, then the method of sway control 600 may proceed to a subsequent step where the controller 406 determines whether sway is above a fifth, or a sixth, or a seventh, etc. sway threshold. There may be an infinite number of sway thresholds Z, brake timing durations D, and/or percentage of braking Q. In an exemplary embodiment, Z1 is less than Z2, Z2 is less than Z3, Z3 is less than Z4, etc. Further, D2 is less than D3 and D3 is less than D4, etc. Even further, Q2 is less than PQ and Q3 is less than Q4, etc. In other words, the time periods D1, D2, D3, D4, etc. and the voltages Q2, Q3, Q4, etc. may increase as the sway thresholds Z1, Z2, Z3, Z4, etc. increase. The time period and voltage for braking, therefore, increase as the angular velocity (in two directions) increases.

As described in detail above, the sway control device 12 may work independently of the towing vehicle 36 or any components of the towing vehicle 36. In such embodiments, the sway control device 12 is simply mounted to the trailer 18 and controls the trailer brake system 48. The trailer 18 may receive power from the towing vehicle 36, but may not otherwise be controlled from or communicate with the towing vehicle 36. In alternative embodiments, the sway control device 12 may be in communication with a brake controller 62 disposed within the towing vehicle 36, for example in the cab of a semi-tractor trailer, for controlling braking of the towing vehicle 36. More particularly, the sway control device 12 may be wired to the brake controller 62 utilizing typical towing vehicle wiring (e.g., by connecting the blue wires provided in the towing vehicle 36 and the trailer 12). The brake controller 62 may include an accelerometer and/or any other suitable components. The brake controller 62 may also be networked for wireless communication, for example, wi-fi, Bluetooth, WirelessHD, WiGig, Z-Wave, ZigBee, Bluetooth® low energy, or any other suitable form of wireless communication. In this manner, an operator of the towing vehicle 36 may utilize a wireless device 64, such as a tablet, a cellular phone, or any other wireless device, to communicate with and control the brake controller 62 and/or the sway control device 12 (through the brake controller 62). The wireless device 64 may access the brake controller 62 by way of a website, an application downloaded on the wireless device 64, or in any other suitable manner.

In an exemplary embodiment, the wireless device 64 is a mobile telephone with an application downloaded onto the mobile telephone. The application may include functionality to display the status of the brake controller 62 and/or the sway control device 12. In exemplary embodiments, the application displays information regarding one or more of the following: the trailer speed, the angular velocity (at one or more points in time), braking actions taken (e.g., one or more of a time of braking, a duration of braking, a reason for braking, etc.), and/or any other suitable information regarding the trailer or discussed herein. In some embodiments, the wireless device automatically pairs with the wireless communication device within the brake controller 62 upon opening of the application. The operator may also be able to control the sway control device 12 through the application, for example, command signals may be sent wirelessly from the wireless device 64 to the brake controller 62 and, thereafter, the signals would be sent through a wired connection (as described above) to the sway control device 12.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. A device for controlling the sway of a vehicle comprising:
   a global positioning system (GPS) receiver operable to detect a speed of the vehicle;
   a rate gyro operable to detect sway of the vehicle;
   a voltage regulator coupled to the rate gyro;
   a controller coupled to the voltage regulator, the GPS receiver, and the rate gyro;
   wherein the GPS receiver and the rate gyro provide speed information and sway information to the controller; and
   wherein the controller outputs a brake command:
     if the speed of the vehicle is above a first predetermined threshold and sway of the vehicle in only a first lateral direction is above a second predetermined threshold and the brake command is to apply the brakes of the vehicle for a first predetermined period of time;
     if the speed of the vehicle is below the first predetermined threshold and sway of the vehicle in a first lateral direction and a second lateral direction opposite the first direction is above a third predetermined threshold and the brake command is to apply the brakes for a second predetermined period of time.

2. The device of claim 1, wherein the first predetermined threshold is 75 kilometers per hour.

3. The device of claim 1, wherein the second predetermined threshold is 2.5 degrees per second.

4. The device of claim 1, wherein the first and second predetermined periods of time are different.

5. The device of claim 1, wherein the first and second predetermined periods of time are the same and are 2 seconds.

6. The device of claim 1 wherein the third predetermined threshold is 2.5 degrees per second.

7. A device for controlling sway of a trailer comprising:
   a housing attached to the trailer and including;
     a global positioning system (GPS) device to detect a speed of the trailer;
     a rate gyro to detect sway of the trailer; and a controller coupled to the GPS device and the rate gyro;

wherein the GPS device and the rate gyro provide the speed and the sway angle to the controller; and wherein the controller outputs a brake command if a first speed threshold is satisfied and a second sway threshold is satisfied;

wherein all components of the device for controlling sway are located on the trailer.

8. The device of claim 7, wherein the first speed threshold is satisfied if the speed is above the first speed threshold.

9. The device of claim 8, wherein the first speed threshold is satisfied when the speed is above 75 kilometers per hour.

10. The device of claim 8, wherein the second sway threshold is satisfied if the sway is above the sway threshold in only a first lateral direction.

11. The device of claim 10, wherein the first speed threshold is satisfied when the speed is above 75 kilometers per hour and the second sway threshold is satisfied if the sway in the first lateral direction is greater than 2.5 degrees per second.

12. The device of claim 7, wherein the first speed threshold is satisfied if the speed is below the speed threshold.

13. The device of claim 12, wherein the first speed threshold is satisfied when the speed is below 75 kilometers per hour.

14. The device of claim 12, wherein the second sway threshold is satisfied if the sway measured in both a first lateral direction and a second lateral direction opposite the first lateral direction is above the second sway threshold.

15. The device of claim 12 wherein the first speed threshold is satisfied when the speed is below 75 kilometers per hour and the second sway threshold is satisfied if the sway measured in both the first and second lateral directions is greater than 2.5 degrees per second.

16. A method for controlling sway of a trailer comprising:
detecting a speed of a trailer;
detecting an angular speed of the trailer; and
sending a first signal, by a controller, to trigger a trailer brake system if a first speed threshold is satisfied and a second sway threshold is satisfied.

17. The method of claim 16 wherein the first speed threshold is satisfied if the speed of the trailer is above the speed threshold and the second sway condition is satisfied if the angular speed of the trailer is above the sway threshold in only a first direction.

18. The method of claim 17, wherein the first speed threshold is satisfied when the speed is above 75 kilometers per hour and the second sway threshold is satisfied when the angular speed of the trailer is above 2.5 degrees per second.

19. The method of claim 16, wherein the first speed threshold is satisfied if the speed of the trailer is below the first speed threshold and the second sway threshold is satisfied if the angular speed of the trailer is above the second sway threshold in first and second opposing lateral directions.

20. The method of claim 19, wherein the first speed threshold is satisfied when the speed is below 75 kilometers per hour and the second sway threshold is satisfied when the angular velocity is 2.5 degrees per second.

* * * * *